(12) United States Patent
Franken et al.

(10) Patent No.: US 9,092,715 B2
(45) Date of Patent: Jul. 28, 2015

(54) IDENTIFICATION FEATURE (75) Inventors: Klaus Franken, Igis (CH); Alfred Rutz, Trin (CH)

(73) Assignee: U-NICA Technology AG, Malans (CH)

( * ) Notice: Subject to any disclaimer, the term of this patent is extended or adjusted under 35 U.S.C. 154(b) by 190 days.

(21) Appl. No.: 13/059,360

(22) PCT Filed: Aug. 27, 2009

(86) PCT No.: PCT/EP2009/061073
§ 371 (c)(1),
(2), (4) Date: Feb. 16, 2011

(87) PCT Pub. No.: WO2010/023243
PCT Pub. Date: Mar. 4, 2010

(65) Prior Publication Data
US 2011/0150342 A1 Jun. 23, 2011

(30) Foreign Application Priority Data

Aug. 29, 2008 (CH) .................................... 1386/08

(51) Int. Cl.
*G06K 9/46* (2006.01)
*G02B 27/42* (2006.01)
*G02B 5/32* (2006.01)
*G06K 19/16* (2006.01)
*G06K 9/00* (2006.01)
*G06K 19/08* (2006.01)
*G06K 19/18* (2006.01)
*G06K 17/00* (2006.01)

(52) U.S. Cl.
CPC ............ *G06K 19/16* (2013.01); *G06K 9/00577* (2013.01); *G06K 19/086* (2013.01); *G06K 19/18* (2013.01); *G06K 2017/0064* (2013.01)

(58) Field of Classification Search
CPC .................. G06K 19/16; G06K 19/18; G06K 19/06046G06K 19/06; G06K 19/08; G06K 19/086; G06K 2019/0629; G06K 9/00577; G06K 19/06009; G06K 2017/0064; G06K 19/10; B42D 25/328; B42D 25/00; B42D 25/391; B42D 2035/34; B42D 25/382; B42D 25/387; B42D 2035/02; G07F 7/086; G07F 7/08; G03H 2001/0016; G03H 1/0011; H04N 1/32144
USPC ............... 382/108, 111, 141, 190; 359/2, 558
See application file for complete search history.

(56) References Cited

U.S. PATENT DOCUMENTS 5,422,744 A 6/1995 Katz et al.
5,432,329 A * 7/1995 Colgate et al. ................ 235/487
(Continued)

FOREIGN PATENT DOCUMENTS

WO 96/36010 A2 11/1996

*Primary Examiner* — Edward Park
*Assistant Examiner* — Michael Vanchy, Jr.
(74) *Attorney, Agent, or Firm* — Sughrue Mion, PLLC (57) ABSTRACT

An identification feature for identifying an object comprises at least two identification elements, wherein at least a first identification element thereof is formed by at least one defined, delimited surface with a defined diffractive surface structure that can be recognized through light irradiation in the visual range, and at least one second identification element is provided within an optical detection field, said second identification element at least partially detecting the defined, delimited surface of the first identification element. In a method for identifying the object, the position at which the at least one second identification element is located relative to the at least one first identification element is stored in memory. Further, identification information unique to the at least one second identification element is stored in memory. A depiction of the first identification element is compared to the stored data for the purposes of identification.

13 Claims, 4 Drawing Sheets

(56) References Cited

U.S. PATENT DOCUMENTS

| | | | |
|---|---|---|---|
| 6,263,104 B1* | 7/2001 | McGrew | 382/210 |
| 6,608,911 B2* | 8/2003 | Lofgren et al. | 382/100 |
| 6,707,927 B1* | 3/2004 | Kita et al. | 382/100 |
| 2001/0005570 A1 | 6/2001 | Daniel et al. | |
| 2002/0170966 A1 | 11/2002 | Hannigan et al. | |
| 2005/0239207 A1* | 10/2005 | Gelbart | 436/56 |
| 2006/0157559 A1* | 7/2006 | Levy et al. | 235/380 |
| 2008/0081213 A1* | 4/2008 | Ito et al. | 428/656 |
| 2008/0197620 A1* | 8/2008 | Spencer et al. | 283/81 |

* cited by examiner

IDENTIFICATION FEATURE

TECHNICAL FIELD

The present invention relates to an identification feature for identifying an article, in particular for authenticating or tracking an article, and to a method for identifying, or authenticating, an article.

PRIOR ART

In a wide variety of financial and technical fields, the problem of forgery for original products is constantly on the increase. New technologies allow mass copying of the originals in a quality which makes them barely or not at all distinguishable from originals with the naked eye. What are affected are not only luxury articles but also components of technical devices, e.g. in the field of automobile construction, medical engineering or the electronics industry, with in some cases also safety-relevant properties. In order to protect themselves against this kind of product piracy, many manufacturers provide their products with identification features in order to be able to check the authenticity of the products or track the path thereof. Such identification features are usually fitted to a product or component subsequently, for example in the form of stickers or overprints. The stickers or overprints may have holograms or hidden codings, for example.

EP 1 168 253 discloses, by way of example, a method and a system for authentication, in which articles or documents have as an identification feature a dot pattern or the like which can be imaged by means of electromagnetic radiation, e.g. a camera or other optical devices of a communication appliance. The radiation reflected by the dot pattern is detected by the communication appliance and compared with data from a data memory which stores the data from information relating to dot patterns from original articles or documents. The optical devices used are, inter alia, also IR or UV emitter/receivers or RF transmitter/receivers.

US 2008/0002882 describes a security and authentication system in which products or documents are assigned a PIN (product identification information) by the manufacturer. The PIN is a digital code which is produced by encrypting identification information by means of an encryption mode and is fitted to a product or document as a marking in the form of text, vector graphics or visual presentations. The identification information and the encryption mode are stored in a PIN database. The marking can be photographed using a portable appliance, such as a mobile telephone, a pocket computer or the like. The photograph of the marking can then be transmitted by means of telecommunication via SMS or MMS, by a Bluetooth device or else via Internet connections to the PIN database server, which decrypts the PIN and identifies the marking as an original or forgery. The result can be transmitted to the portable appliance and therefore provides the user with information about the authenticity of the product or document.

WO 2007/002873 discloses identification and security features in the form of labels which are distinguished by the uniqueness of their surface structure. The labels are produced from crystalline material, partly combined with noncrystalline material, or from a combination of polymers, which form unique patterns given suitable machining on their surface. The patterns are produced as random patterns during manufacture and differ in terms of the size and shape of the structure of individual areas of the surface (e.g. crystal structure or granularity) and therefore form a unique individual, non-reproducible identification feature.

The material used is metals, ceramics, alloys or polymers, for example. The labels can be produced by particular dissolving or melting processes, for example. Next, the labels are cut or stamped and fitted on a product or document. The random patterns of the labels are imaged using UV or IR light or using visible light, for example, and the unique pattern thereof is therefore captured. The measured data, such as wavelength of the light or the angle of incidence for the imaging, are stored and numbered in a database. To check authenticity, a product or document is exposed and the ascertained data are compared with the previously stored data using pattern recognition software.

WO 96/36010 describes a security feature which comprises two different identification elements. A first identification feature is provided by a semitransparent conventional hologram. The hologram can be repeated in a random distribution over the surface of an article. A second identification element is provided by a metal grating layer which is fitted to the surface of the article and also above the first identification element, which means that the two identification elements are therefore arranged above one another and both the first and the second identification element are always visible.

US 2001/005570 A1 discloses a method for marking articles or documents in which an identification means and an authentication means are provided. The identification means used is barcodes, photographs or symbols, for example. The authentication means comprises a diffractive optical marking, such as a hologram. The authentication means is fitted above the identification means in such a manner that it is not possible to separate the authentication means from the identification means without the latter being destroyed in the process.

U.S. Pat. No. 5,422,744 shows an identification means with a barcode which is embedded in a holographic image. In this case, a label or an article, such as a credit card, is provided with a barcode symbol which is recorded holographically. In addition, a hologram element with a barcode symbol in the relatively close environment thereof can be provided. For example, the barcode is printed directly onto the surface of a polymer film which forms a hologram. In this case the barcode can likewise be perceived hologramatically.

The methods from the prior art involve an identification feature being subsequently fitted or allocated to products or documents, i.e. the identification features must first of all be produced or created and can then be used for marking (packaging level). In addition, these identification features usually use only one kind of identification system, such as the capture and storage of characteristic properties of a label or the allocation of security codes. In the methods cited, verification of a product or a document first of all requires the identification feature to be captured and forwarded to a data processing unit which, following processing, supplies a comparison result to the user. The methods are therefore time consuming and usually require large data memories for saving the extensive identification information. In the case of simple identification features, such as holograms, the verification can be performed in-situ. Such simple identification features can also easily be forged, however.

It is therefore an object of the present invention to provide an identification feature and a method for identifying and authenticating articles which increase the security of an article provided with the identification feature, which can be provided on the article without additional complexity and which are simple in handling and performing the identification.

PRESENTATION OF THE INVENTION

An identification feature for identifying an article according to the present invention comprises at least two identification elements. At least the first of the identification elements is provided by at least one definedly bounded surface with a defined diffractive surface structure which can be recognized by virtue of incident light in the visual range. At least the second of the identification features is provided within an optical coverage field which at least partially contains the definedly bounded surface of the first identification element, particularly within the definedly bounded surface of the first identification element. Preferably, the coverage field comprises all of the first identification element. The second identification element is provided, by way of example, in the relatively close surroundings of the definedly bounded surface of the first identification element on the surface of the article, so that it falls within the coverage field of an optical imaging device when the first identification element is imaged. The size of the coverage field may therefore be dependent on the imaging device used. Preferably, the second identification element is arranged in such proximity to the first identification element, however, that it comes to rest in the coverage field of different, conventional imaging devices.

According to the invention, the identification elements are produced on the surface of the article, preferably directly during the manufacture of the article. The identification feature is therefore an integral part of the article and not an additionally and subsequently fitted element, such as a label or sticker, on the article.

The definedly bounded surface of the first identification element may be provided by geometric designs on the surface, such as letters, numbers or other symbols. The shape, or border, or the edges of the symbols define the bounding of the surface. The definedly bounded surface can also be developed by means of a depression or elevation relative to a surrounding surface of the article.

The defined diffractive surface structure of the surface of the first identification element is preferably produced by a structure in the style of an optical grating in the material of the article on the surface. By way of example, the grating structure produces regular structures in the nanometer range, such as depressions or elevations in the order of magnitude between 100 and 200 nm. Such a grating structure can be used to diffract light in the visual range such that characteristic diffraction patterns are formed which can be used as an identification element. Electromagnetic radiation in the wavelength range between approximately 350 nm and 800 nm is considered to be light in the visual range. Visible gray or colored shadowing, interference effects in the form of hologramatic forms or holographic representations are produced for the eye. The characteristic color change on account of the interference effects allows simple verification of the identification element by means of the naked eye. In principle, however, structures in the micron range are also possible which, given suitable incidence of light, can be recognized with the eye or, given the incidence of electromagnetic radiation of suitable wavelength, are visible. A defined diffractive surface structure according to the invention can be provided on planar, convex or concave surfaces of the article. The regular structure may be in a form such that images or lettering can be recognized.

The at least one second identification element is provided within the optical coverage field of a imaging device, with the result that it is automatically imaged at the same time as the visually apparent first identification element is imaged. The imaging of the second identification element is therefore assured even when the user imaging the first identification element does not know where the at least one second identification element is situated, or has no knowledge at all of the fact that a second identification element exists. The position of the second identification element relative to the first identification element may optionally be a characteristic part of the second identification element. Preferably, the second identification element is provided such that it cannot be seen. The identification element may be in the form of a structure or representation in an order of magnitude which cannot be recognized by the human eye, or the identification element is in the form of a digital coding. Accordingly, an observer cannot identify the position of the second identification element relative to the first identification element.

In one preferred embodiment, the second identification element is provided by a random structure in a surface of the second identification element, or the surface of the article. Random structures of this kind can deliberately be produced by means of appropriate machining of the material when the article is manufactured. Alternatively, they can be produced randomly, or unintentionally, by virtue of deviation from a perfectly regularly manufactured surface, as is the case when the material is machined or processed, on account of shortcomings or minimal deviations from the ideal manufacturing process. With particular preference, the second identification element is provided by a random structure, or irregularities within the defined diffractive surface structure of the first identification element. In this context, the random structure may advantageously be produced by means of random deviations from the regular surface structure of the first identification element. Random structures of this kind are not foreseeable and therefore not reproducible. They therefore form a unique characteristic feature on the surface of the article, and preferably on the defined surface of the first identification element.

According to the present invention, an identification feature having at least two identification elements, which are preferably produced on the surface of the article directly at the same time as the article is manufactured (item level) is provided. In one embodiment of the invention, the identification feature is produced by means of injection molding during the manufacture of articles. In this case, a negative template form is provided in the surface of the injection-molding tool for the purpose of producing the definedly bounded surface of the at least one first identification element with a defined diffractive surface structure. The negative template form defines the boundary of the surface and the diffractive pattern, or the diffractive surface structure of the first identification element. During the manufacture of the injection-molded part, the negative template form stamps the defined diffractive surface structure into the surface of the injection-molded part and therefore produces at least one first identification element of the identification feature according to the invention.

The injection molding process involves plastic, such as thermoplastic polymers, polyolefins, e.g. polyamide, polycarbonate, polyethylene, polypropylene, etc. or mixtures thereof, being injected into the cavity of the injection-molding tool at high temperature in fluid state. Next, the heated plastic is cooled, or quenched, with the plastic solidifying in accordance with the shape of the cavity. When the plastic solidifies, molecular units can orient themselves to one another (e.g. in the case of crystalline polymers) or random amorphous structures (e.g. in the case of amorphous polymers) are formed. Since in practice ideal curing without irregularities or faults in the surface of the injection molding is not possible, grating faults, irregularities, areas of different orientation or granularity, etc. are produced along the surface, inter alia, on the basis of a random principle and form random structures. It is possible to admix additives with the plastic, which additives promote or actually first allow the production of random structures. The additives used may be crystallization germs, pigments, dye or the like. These random structures and the randomly arranged amorphous areas are used as a second identification element in accordance with the invention. Since such random structures are also produced in the area of the negative template form of the cavity, the defined diffractive surface structure of the first identification element and the random structures of the second identification element are simultaneously produced in this area.

In principle, the production of a second identification element within the surface structure of a first identification element in accordance with the invention is not limited to plastics. Such identification elements can also be produced when manufacturing components for metals, alloys or ceramics. In the case of metals, tin plate, aluminum or titanium, inter alia, are suitable for this purpose.

In the case of an identification feature with at least two identification elements, the present invention makes use of the fact that a first identification element can be identified on a first recognition level (first level) and a second identification element cannot be identified until on a second recognition level (second level, third level). The first identification element can be used to locate or localize the second identification element more easily, however. The second identification element can therefore be produced in a less complex manner. By way of example, smaller areas or simpler codings can be selected for the identification, for example. Preferably, the identification information in the second identification element is provided by the properties of the first identification element or is substantiated by said properties. With particular preference, the randomly developed properties of the first identification element are used as identification information for the second identification element.

A method for identifying an article with an identification feature which has at least one first and at least one second identification element, as has been described above, involves the position of the at least one second identification element relative to the at least one first identification element being determined after the manufacture of the article, or the fitting of the identification feature to the article. The position can be determined by means of optical imaging of the first identification element, for example. In this context, it is possible to image the first identification element first of all and to use the image to select an area within or at least in the relatively close surroundings of the first identification element, the structure of which is suitable as a second identification element, and to determine the position of said area as the position of the second identification element. In this case, it should be ensured that an area is selected which is situated within the coverage field of a imaging device. It is naturally also possible to select two or more areas. Instead of using the surface structure of an article as a second identification element, it is also possible for a coding to be attached to an area of the first identification element as a second identification element. The optical image of the first identification element can then be used to determine that area, or that position of the first identification element, from which the code can be taken.

The characteristic and unique imaging of the surface structure, preferably in the form of a random structure, is stipulated as a piece of identification information for the second identification element, which identification information item explicitly determines the identification element and hence the article. Alternatively, the stored coding can be stipulated as an identification information item for the second identification element.

The determined position and the identification information for the at least one second identification element are registered and stored in a data memory, or a database. The data from all the articles which are intended to be identified, or verified, using the method according to the invention can be stored in a single database or in a manner divided into different databases.

In order to identify an article, said article is first of all assessed using the at least one first identification element. It may be possible for just the first identification element to be used to establish that a forgery is involved and the check is complete. Since the first identification element can be checked by means of incidental light in the visual optical range, this check can easily be performed in situ without further tools. If there are doubts as to the authenticity of the article, the at least one second identification element can be used for a further check. For this, the definedly bounded surface of the first identification element is imaged using an optical imaging appliance. In principle, it is possible to use all known imaging appliances, such as scanners, cameras, laser reflection devices, CCD cameras, etc., which use coherent electromagnetic radiation.

Preferably, the at least one second identification element(s) is/are in a form such that it/they can be imaged by imaging devices which are integrated in portable communication appliances, known from the prior art. Such portable communication appliances are mobile telephones, pocket computers, PDA appliances (personal digital assistant) etc., for example. Preferably, surface structures are used as identification elements in an order of magnitude of millimeters or microns for this purpose. In addition, the identification elements may be defined by the following characteristics and hence bear explicit and unique identification information: crystal structure, granularity, shadowing, crystallinity, photo luminescence, fluorescence, refractive index, surface energy, surface voltage or hydrophobic/hydrophilic properties. Known portable communication appliances are capable of using light in the UV, IR and visible ranges to image the identification element and of registering the imaging. When selecting a position, or a second identification element, the resolution properties of the imaging appliance used have to be borne in mind. Simple mobile appliances generally have a resolution in the VGA or MCGA range. In the meantime, however, mobile telecommunication appliances with a resolution extending into the QXGA or QWXGA range, or in the megapixel range, are also available on the market. In addition, it is possible to image the structure of a second identification element using video recording technology. For this, it is possible to implement a resolution in the PAL range of mobile appliances, for example. When using appliances with resolutions in the UHDV range, it is accordingly possible to select finer structures as the second identification element.

In accordance with the invention, the imaging is used to extract the position of the at least one second identification element, and the identification information from the second identification element at this position is captured. The captured identification information is compared with the positions and identification information from the data memory, or the database, for example using pattern recognition software or using a decoder. If it is possible to identify the identification information read from an article in the data in the memory, a registered original article is on hand. Otherwise, it is a forgery. The result of the comparison of the image with the stored identification information is transmitted to the user in suitable form.

In one preferred embodiment, the portable communication appliance has a telecommunication device which can be used to transmit the imaged data by means of telecommunication to an external server, or the database in which the identification information relating to the articles is stored. A user, such as a purchaser of a luxury article or a technically high-end article, can then easily verify the authenticity of the article or identify a particular article in situ when purchasing the article. He can first of all check the at least one first identification element and can also use his mobile telephone, for example, in which a camera is integrated, to create an image of the first identification element. He can readily use the first identification element to identify the point which needs to be imaged for the check. The image can be sent to a data processing server by means of mobile radio networks, such as GSM or UMTS networks, e.g. as an MMS message, said data processing server comparing the identification information with the collected data in the database. The result of the comparison can immediately be returned to the user via the mobile radio network.

In another application of the method according to the invention, the imaging can also be produced using a camera in a pocket computer, for example, which sends the image to a server via the Internet, e.g. by means of a WLAN connection. Naturally, other telecommunication channels and also conventional wire transmissions are also conceivable.

Alternatively, the identification information for a comparison in accordance with the method according to the invention may also be stored in the portable communication appliance. A piece of pattern recognition or decoding software can be used to perform a comparison for the identification information from imaging directly in the portable telecommunication appliance and to display the result on a display of the appliance. By way of example, the data can be downloaded from the data server onto the portable telecommunication appliance using the Internet.

One advantage of the present invention is that the recognition or identification of the at least one first identification element can actually perform a preliminary check on an article. To a certain extent, the first check is effected on a coarse structure of the identification feature. In order to increase the dependability of the verification, it is also possible to use the at least one second identification element. Since the known position of the second identification element relative to the first identification element means that the area which needs to be considered for examining the second identification element is already very restricted, the necessary volume of data is reduced and a comparison with stored data and with the data ascertained during the check can take place more quickly and more dependably. Explicit recognition of an article is possible. In addition, reliable and dependable tracing can be performed, as used for track and trace methods, for example.

In a further embodiment of the present invention, it is also possible to store identification information for the at least one first identification element in the database. Preferably, this involves the use of identification information from an area of the first identification element which is close to the position of the second identification element, or preferably at the same position as the second identification element. The identification information may comprise a color code or details about the surface structure, for example. The identification information from the first identification element can be verified at the same time as the identification information from the first identification element is checked by virtue of the imaging of the first identification element.

BRIEF DESCRIPTION OF THE DRAWINGS

Preferred embodiments of the invention are described below with reference to the drawing. Features of the invention which can be seen from the figures are intended to be understood as part of the disclosure. The figures are in no way intended to be regarded as a restriction. In the figures.

DETAILED DESCRIPTION OF PREFERRED EMBODIMENTS

Figure 1:
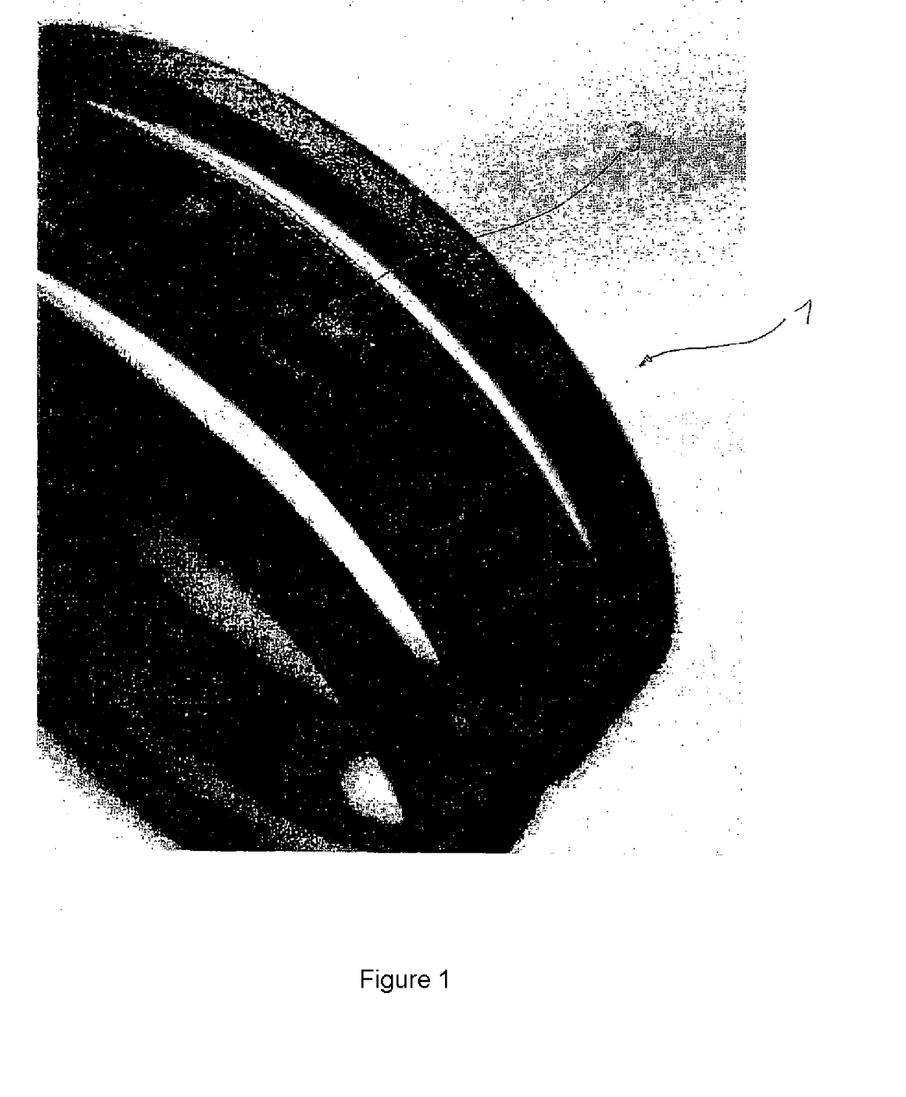
FIG. 1 shows a first embodiment of the present invention using a portion of an electrical component.

FIG. 1 shows a portion of an electrical component 1 having an identification feature based on the present invention in the form of a resilient ring. The component 1 has been manufactured by means of injection molding and is of essentially annular form with a curved, or convex, surface. The circumferential face of said component has lettering "u-nica" integrated in the surface. The lettering extends arcuately over the circumferential face of the component 1. The surfaces of the letters in the lettering each form a first identification element 3 based on the invention. The edge of the individual letters defines the boundary of the surface of a first identification element 3. The surface of the letters is in the form of a defined diffractive surface structure. When daylight or, by way of example, artificial light, as used for room lighting, is incident, the definedly diffractive surface structure shimmers in a unique way in colors which are distinctive for the component 1 on account of interference effects. The color effect can be used to perform a first check on the component 1 for authenticity. A second identification element of the identification feature is provided on the component 1 such that it cannot be seen, as preferred in accordance with the invention.

In the case of such a component, it is also possible for a plurality of components, for example belonging to a production series, to bear an identification feature having an identical first identification element. As in the present example, the first identification element may be provided by the hologrammatically shimmering lettering "u-nica". The first identification element can be used to identify the individual components as belonging to the production series and to presort them, for example, and they can then be subjected to a further check.

Figure 2:
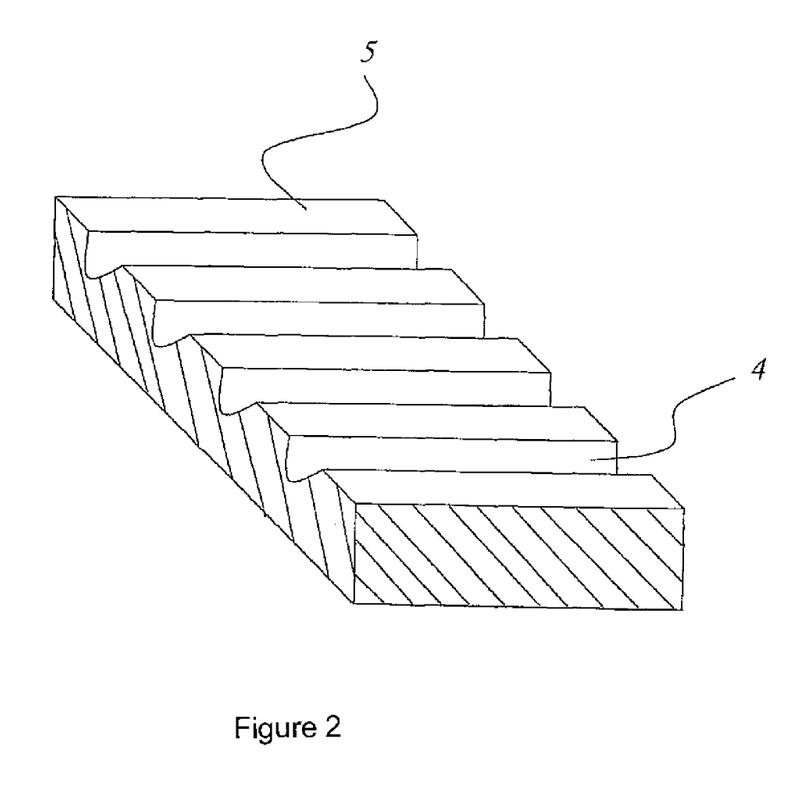
FIG. 2 shows a microscopic illustration of an identification element based on the present invention.

FIG. 2 shows a microscopic snapshot of the defined diffractive surface structure 4 of the first identification element 3 of the component 1. In this case, the component 1 has been manufactured using an injection molding process, in which a negative template form has been provided in the cavity of the injection molding system for the purpose of producing the surface structure of the component 1. The surface structure has elevations 5 running rectilinearly parallel at a defined distance from one another. The elevations 5 have a defined gradient angle on both sides. The elevations 5 on the surface produce a diffraction grating. When electromagnetic radiation is directed onto the grating, an interference effect is produced which is visually perceptible and serves as a first identification element.

Figure 3:
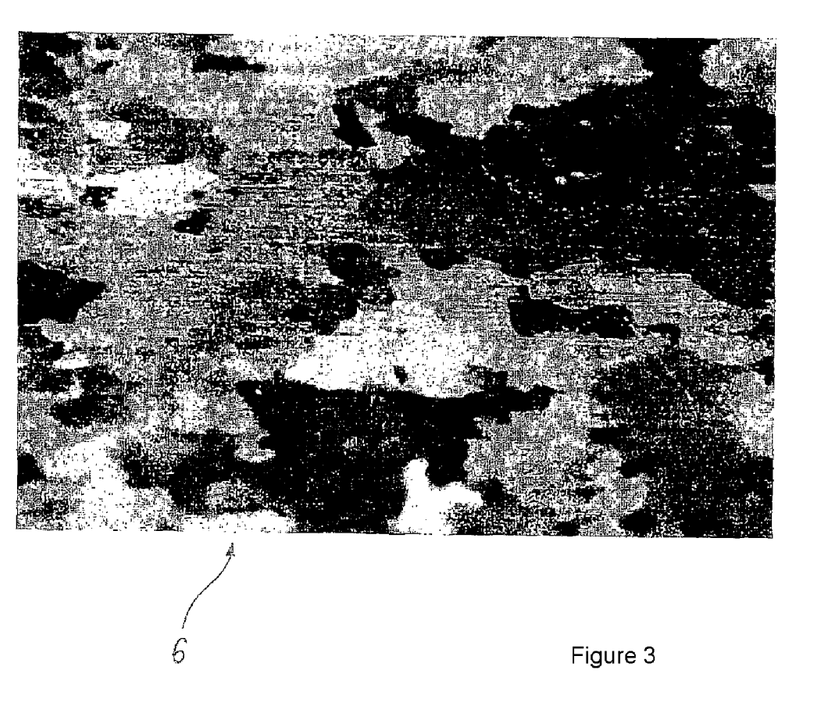
FIG. 3 shows a microscopic illustration of a further identification element based on the present invention.

FIG. 3 shows a microscope snapshot of the surface from the surroundings of the letters in the lettering. In this embodiment of the component 1, a random structure 6 has been produced in the material of the component 1 on the surface of the component 1 around the lettering. The random structure is characterized by various light and dark areas which are produced at random on the surface during the manufacture of the component 1, as has been described above. The material produces such random structures as a result of the rapid cooling after injection into the cavity of the injection molding system. The pattern of the random structure is unique and can be used to identify the component 1. The random structure forms a second identification element of the identification feature according to the invention. If the random pattern is imaged using an imaging appliance, it is possible to select an area which is particularly suitable for distinction from other areas on account of its structure. By way of example, the individual regions in a selected area may be designed to have a particularly high level of contrast. This area is selected as a second identification element, and the associated position relative to the first identification element is stored. Since this method involves not all of the data from the image being stored, but rather only a selected area, the volume of data to be stored is reduced.

Figure 4:
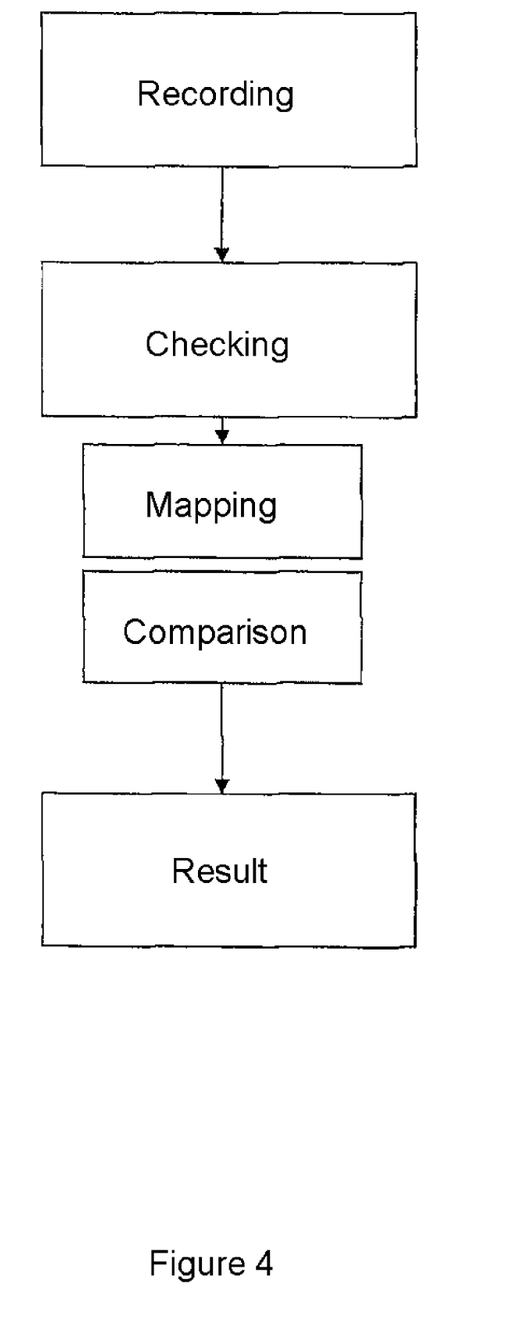
FIG. 4 shows a flowchart for the sequence of a method according to the present invention.

FIG. 4 schematically shows the sequence of the individual steps for providing and performing an identification and/or authentication method based on the present invention.

Registration: Following the manufacture of an article with an identification feature which is intended to be verified or traced back using the method according to the invention, the article is registered. This is done by stipulating a first identification element with a defined bounded surface, which identification element is used as a kind of reference for a second identification element. An area within or close to the defined bounded surface is stipulated, for example by geometric features or else by photographing the article using an optical imaging appliance, so that the position of a second identification element relative to the first identification element can be determined. The second identification element is preferably not visible. The unique characteristic features of the second identification element are taken from the image of the identification element and can therefore be captured. Alternatively, a digital code is stored at the position of the first identification element and is used as a second identification element. The characteristic features of the second identification element and the position of the second identification element relative to the first identification element are stored as explicit identification information in a database. Optionally, it is also possible for the characteristic data of the first identification element to be registered in the database. Such registration can be performed fully automatically and is therefore not very costly and time consuming.

Check: After the article has been registered, it can be put into circulation. In order to track the path of the article or in order to check the authenticity thereof, a user of the method according to the invention can use an imaging appliance to take an image of the article. The imaging appliance used is preferably a portable telecommunication appliance, particularly preferably a mobile telephone with a built-in camera. The user takes an image of the first identification element at the point on the article at which the visually apparent first identification element is provided. Next, he sends the image, for example as an MMS message, using a mobile radio link to the database server, or a processor, which communicates with the database. A piece of software uses the identification information from the database to find the position of the second identification element on the article and the associated identification information at said position on the second identification element and compares them with the information from the current image of the article. For this, it is enough only to verify the information data at the position of the second identification element. Further data relating to other areas or characteristics of the second identification element which are likewise contained in the image do not need to be checked.

Result: If the data captured with the image match a data record for an identification information item in the database, a message, e.g. in the form of an SMS message, with a positive result is transmitted to the user. However, if the data from the image did not match any identification information, the article has not been registered and is therefore a forgery, or not the desired article. In this case, a negative result is transmitted to the user.

As already described at the outset, it is also possible to use other kinds of portable communication appliances within the context of the invention. Similarly, there are various transmission options both for interchange of the identification information and for transmission of a result from the verification. The invention has been described by way of example with reference to a procedure and an identification feature on an article. Naturally, there are modifications in this regard which similarly fulfill the same function as the present invention and are covered by the inventive concept.

LIST OF REFERENCE SYMBOLS

1 Component
3 Identification element
4 Surface
5 Elevation
6 Surface pattern

The invention claimed is:
1. A method for identifying an article with an identification feature, wherein the identification feature comprises:
at least one first identification element, and
a second identification element;
wherein the first and the second identification elements are an integral part of the article;
said method comprising the steps of:
choosing at least a first of the identification elements as at least one definably bounded surface with a defined diffractive surface structure which can be recognized by virtue of incident light in a visual range,
choosing at least a second of the identification elements within an optical coverage field which at least partially covers the definably bounded surface of the first identification element, wherein the second of the identification elements is a random structure,
registering and storing of the position at which the at least one second identification element is arranged relative to the at least one first identification element, and coding of identification information which is unique to the at least one second identification element for this article, and registering and storing the coded data in a database,
imaging of the definably bounded surface of the first identification element using an imaging appliance,
extracting the position of the second identification element from the data stored in the database,
capturing the information relating to the second identification element at the position of the second identification element,
comparing of the information of the second identification element with the data stored in the database, and
generating an output signal representative of the result of the comparison of the stored and imaged identification information,
wherein the at least one second of the identification element is of random structure, wherein the random structure is an optical recognizable random property of the surface within the second identification element, and wherein the at least one second identification element is not visible to a human eye and can be detected through the position data stored in the database.

2. The method as claimed in claim 1, wherein identification information from the first identification element is stored.

3. The method as claimed in claim 1, wherein the position and identification information are stored in an external database.

4. The method as claimed in claim 1, wherein the imaging appliance used is a portable communication appliance with an imaging device.

5. The method as claimed in claim 4, wherein the data from the imaging are transmitted to the external database by means of telecommunication by the portable communication appliance.

6. The method as claimed in claim 4, wherein the result of the comparison is transmitted to the portable communication appliance.

7. An article having an identification feature for identifying it, comprising
- at least one first identification element provided by at least one definably bounded surface with a defined diffractive surface structure which can be recognized by virtue of incident light in a visual range, and
- at least one second identification element provided within an optical coverage field which at least partially covers the definably bounded surface of the first identification element,
- wherein the first and second identification elements are an integral part of the article,
- wherein the second of the identification elements is a random structure,
- wherein information relating to the position at which the at least one second identification element is arranged relative to the at least one first identification element and identification information which is unique for the at least one second identification element for this article are stored in a database, and
- wherein the at least one second identification element is not visible to a human eye and can be detected through the position data stored in the database.

8. The article as claimed in claim 7, wherein the at least one second identification element is provided by a random structure in a surface of the second identification element or the article.

9. The article as claimed in claim 7, wherein the random structure of the second identification element is integrated in the defined diffractive surface structure of the first identification element.

10. The article as claimed in claim 7, wherein the defined diffractive surface structure produces a hologram-like interference effect or a hologram.

11. The article as claimed in claim 7, wherein the defined diffractive surface structure and the random structure are produced on a plastic surface.

12. The article as claimed in claim 11, wherein the plastic surface is formed by amorphous or crystalline polymers or a polymer mixture.

13. The article as claimed in claim 7, wherein the defined diffractive surface structure and the random structure are produced on a metal surface.

* * * * *